US009962905B2

(12) United States Patent
Duoss et al.

(10) Patent No.: US 9,962,905 B2
(45) Date of Patent: May 8, 2018

(54) THREE-DIMENSIONALLY PATTERNED ENERGY ABSORPTIVE MATERIAL AND METHOD OF FABRICATION

(71) Applicants: Eric Duoss, Dublin, CA (US); James M. Frank, Lewisville, TX (US); Joshua Kuntz, Livermore, CA (US); Robert S. Maxwell, Danville, CA (US); Thomas R. Metz, Tracy, CA (US); Christopher Spadaccini, Oakland, CA (US); Thomas S. Wilson, San Leandro, CA (US)

(72) Inventors: Eric Duoss, Dublin, CA (US); James M. Frank, Lewisville, TX (US); Joshua Kuntz, Livermore, CA (US); Robert S. Maxwell, Danville, CA (US); Thomas R. Metz, Tracy, CA (US); Christopher Spadaccini, Oakland, CA (US); Thomas S. Wilson, San Leandro, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days. days.

(21) Appl. No.: 13/905,056

(22) Filed: May 29, 2013

(65) Prior Publication Data

US 2014/0356585 A1    Dec. 4, 2014

(51) Int. Cl.
*B32B 7/04*     (2006.01)
*B32B 5/26*     (2006.01)
(Continued)

(52) U.S. Cl.
CPC ............... *B32B 7/04* (2013.01); *B29C 67/20* (2013.01); *B32B 5/12* (2013.01); *B32B 5/18* (2013.01);
(Continued)

(58) Field of Classification Search
CPC .............................................. Y10T 428/24124
(Continued)

(56) References Cited

U.S. PATENT DOCUMENTS

| 3,730,244 A | * | 5/1973 | Ross | B29D 30/02 |
| | | | | 152/323 |
| 4,001,478 A | * | 1/1977 | King | D03D 41/00 |
| | | | | 139/387 R |

(Continued)

FOREIGN PATENT DOCUMENTS

| DE | 10 2005 050 185 A1 | 4/2007 |
| EP | 2 030 762 A1 | 4/2009 |

(Continued)

OTHER PUBLICATIONS

McDonald, et al., "Prototyping of Microfluidic Devices in Poly(dimethylsiloxane) Using Solid-Object Printing", Analytical Chemistry, vol. 74, pp. 1537-1545 (Apr. 1, 2002).

(Continued)

*Primary Examiner* — Brent T O'Hern
(74) *Attorney, Agent, or Firm* — James S Tak

(57) ABSTRACT

A three-dimensionally patterned energy absorptive material and fabrication method having multiple layers of patterned filaments extrusion-formed from a curable pre-cursor material and stacked and cured in a three-dimensionally patterned architecture so that the energy absorptive material produced thereby has an engineered bulk property associated with the three-dimensionally patterned architecture.

8 Claims, 6 Drawing Sheets

(51) Int. Cl.
*B32B 37/15* (2006.01)
*B32B 5/12* (2006.01)
*B32B 5/18* (2006.01)
*B32B 5/24* (2006.01)
*B29C 67/20* (2006.01)

(52) U.S. Cl.
CPC ............... *B32B 5/245* (2013.01); *B32B 5/26* (2013.01); *B32B 37/153* (2013.01); *B32B 2266/06* (2013.01); *B32B 2266/08* (2013.01); *B32B 2307/56* (2013.01); *Y10T 428/24628* (2015.01); *Y10T 428/24744* (2015.01); *Y10T 428/24851* (2015.01)

(58) Field of Classification Search
USPC .......................................... 428/113; 137/833
See application file for complete search history.

(56) References Cited

U.S. PATENT DOCUMENTS

| | | | |
|---|---|---|---|
| 4,894,281 A * | 1/1990 | Yagi | B29C 70/04 428/298.7 |
| 7,277,770 B2 | 10/2007 | Huang | |
| 2005/0095411 A1 * | 5/2005 | Rasmussen | B29C 47/065 428/212 |
| 2008/0245266 A1 | 10/2008 | Lewis | |
| 2009/0000678 A1 * | 1/2009 | Therriault et al. | 137/833 |
| 2011/0162516 A1 | 7/2011 | St. Claire et al. | |
| 2012/0160086 A1 * | 6/2012 | Carbajal | F41H 5/0485 89/36.02 |

FOREIGN PATENT DOCUMENTS

| | | |
|---|---|---|
| WO | WO 0112430 | 2/2001 |
| WO | 2011119607 A2 | 9/2011 |

OTHER PUBLICATIONS de Gans, et al., "Inkjet Printing of Polymers: State of the Art and Future Developments", Advanced Materials, vol. 16, No. 3, pp. 203-213 (2004).

Schlogl, et al., "UV Induced Microcellular Foaming—A New Approach Towards the Production of 3D Structures in Offset Printing Techniques", Progress in Organic Coatings, 73, pp. 54-61 (2012).

* cited by examiner

THREE-DIMENSIONALLY PATTERNED ENERGY ABSORPTIVE MATERIAL AND METHOD OF FABRICATION

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

TECHNICAL FIELD

This patent document relates to energy absorbing materials and fabrication methods, and more particularly to a three-dimensionally patterned energy absorbing material having a three-dimensionally patterned architecture produced by a layer-by-layer extrusion-formation of patterned filaments so as to exhibit tuned bulk mechanical properties.

BACKGROUND

Cellular silicone foams, e.g. polyorganosiloxane elastomer foams, are commonly used as stress cushions in energy absorbing applications such as for example, to distribute and relieve stress between adjacent parts, dampen shock and vibrations, maintain relative positioning of components through application of stress, mitigate the effect of component size variations due to manufacturing or temperature variations, etc. And various methods of patterning and fabricating cellular silicone foams (both open and closed cell foams) for use as cushions in energy absorbing applications are known. However, the cellular silicone fabrication process is long (about six weeks), difficult, and can result in non-optimal material structure, including mechanical degradation due to high viscosity and shear causing chain scission, and incomplete cure due to urea inhibition. Additionally, cellular foam pores can be too large for some applications. And parts are limited to constant density; density variations or gradations are difficult. There is therefore a need for energy absorbing materials and fabrication methods which are engineered and designed with well-controlled structure and tailored bulk properties.

SUMMARY

One aspect of the present invention includes a three-dimensionally patterned energy absorptive material comprising: multiple layers of patterned filaments extrusion-formed from a pre-cursor material and stacked and cured in a three-dimensionally patterned architecture so that the energy absorptive material produced thereby has a desired bulk property associated with said three-dimensionally patterned architecture.

Another aspect of the present invention includes a method of fabricating a three-dimensionally patterned energy absorptive material comprising: extrusion-forming from a pre-cursor material multiple layers of patterned filaments stacked on a substrate to form a three-dimensionally patterned architecture; and curing the multiple layers of patterned filaments so that the energy absorptive material produced thereby has a desired bulk property associated with said three-dimensionally patterned architecture.

Additional aspects of the present invention may include the three-dimensionally patterned energy absorptive material previously described, and further including at least one of the following: the filaments are patterned so that the three-dimensionally patterned architecture comprises at least one of open-cells and closed cells between filaments; the filaments are patterned so that the desired bulk property of the energy absorptive material is uniform in at least one direction; the filaments are patterned so that the desired bulk property of the energy absorptive material is different for different regions of the energy absorptive material; the filaments are patterned so that the desired bulk property of the energy absorptive material is graded across the different regions of the energy absorptive material along at least one direction; the filaments of a layer are transversely patterned relative to filaments of an adjacent layer; the energy absorptive material has a non-planar surface contour; and the non-planar surface contour of the energy absorptive material substantially conforms to a 3D object against which energy is to be absorbed.

Additional aspects of the present invention may include the method of fabricating a three-dimensionally patterned energy absorptive material previously described, and further including at least one of the following: the filaments are arranged so that the three-dimensionally patterned architecture comprises at least one of open-cells and closed cells between filaments; the filaments are patterned so that the desired bulk property of the energy absorptive material is uniform in at least one direction; the filaments are patterned so that the desired bulk property of the energy absorptive material is different for different regions of the energy absorptive material; the filaments are patterned so that the desired bulk property of the energy absorptive material is graded across the different regions of the energy absorptive material along at least one direction; the filaments of a layer are transversely patterned relative to filaments of an adjacent layer; the substrate surface is non-planar so that the energy absorptive material formed thereon also has a non-planar surface contour; and the substrate surface is contoured substantially similar to a 3D object against which energy is to be absorbed by the energy absorptive material so that the energy absorptive material formed on the substrate substantially conforms to said object.

The present invention is generally directed to mechanical energy absorptive and dissipative materials (hereinafter simply "energy absorptive materials") having a controlled three-dimensionally (3D) patterned filament-based architecture with tailored/engineered bulk-scale properties (which may be modeled and predicted for a given 3D patterned architecture using computer-based modeling and simulation systems). Because the tailored/engineered bulk-scale properties are moldeled and predicted prior to constructing the 3D patterned architecture, they are characterized as predetermined bulk properties. By particularly controlling the filament-based 3D patterned architecture (i.e. the particular arrangement and stacking of the individually patterned filaments in the multi-layered construction, including selecting filament feature size, filament cross-sectional shape (e.g. circular, square, etc.), spacing between filaments, and porosity), various bulk properties, both structural and/or functional, may be tuned and designed for the bulk macro-scale material. For example, the three-dimensionally patterned energy absorptive material may be particularly designed to introduce directionally dependent properties, a feature which further improves the ability of the material to meet differing applications requirements for mechanical compression versus shear.

In addition, the present invention is also generally directed to the design and fabrication of such materials using an additive, extrusion-based process (e.g. direct ink write (DIW) process) that prints inks through nozzles (often of microscale size) to generate the three-dimensionally patterned architecture in a layer-by-layer fashion with controlled filament feature size, porosity, pore size, pore shape, interconnectivity of pores, and geometry. By controlling the patterning of the 3D patterned architecture, the method can vary density/porosity over large range, can vary density spatially in a single part, can vary mechanical response at constant porosity through the structure, and engineer anisotropy in the bulk mechanical properties. The structure of such energy absorptive material may be fabricated with uniform pore structure with feature sizes, e.g. down to about 100 um or less. In any case, the including finer and more uniform structure, more uniform mechanical response, reduced development and processing time, and more predictable aging behavior. The net result is longer component life and higher component margin versus RTV blown or cellular silicone based parts.

The extrudable inks are composed of constituent materials commonly used for energy absorption/dissipation including for example: rubbers, foams, gels, viscoelastic materials, silicones, urethanes, and other commonly used materials for energy absorbing materials. And such ink materials are also characterized as pre-cursor materials generally since they are a pre-cursor to a final form of the material following a curing step. In this manner, energy absorbing materials and products may be designed and fabricated as so-called "designer materials" having custom engineered structures and properties, including the three-dimensional microstructure of the filaments, as well as the three-dimensional net shape of the macrostructure of the energy absorptive material. In another example, porous siloxane cushions and other parts may be custom engineered from the filament-based three-dimensionally patterned architectures. The use of curable siloxane resin materials in particular may be desirable because they are provide high flexibility in varying the base resin (such as with additives such as FOSS) and has no residual catalyst.

Such engineered or designer materials of the present invention may be used, for example, for distribution of stress between components, mitigation of vibration and shock, maintenance of the relative positioning of adjacent components, relief from dimensional changes due to thermal variations, and allowance for tolerances in the dimensions of other parts. Additionally, they may be used, for example, for absorbing impact, sound, vibration, or other types of mechanical energy, in such products as footwear, sports/athletic gear, medical devices, helmets, safety equipment, equine equipment, mattresses, seats, automobile equipment, baby seats, arm rests, acoustically attenuating materials, blast mitigating materials, etc. Furthermore, the energy absorptive material may be particularly designed as mechanically energy absorptive products, such as for example, pads, mats, cushions, inserts, insoles, supports, fixtures, etc.

BRIEF DESCRIPTION OF THE DRAWINGS

The accompanying drawings, where are incorporated into and forma a part of the disclosure, are as follows.

DETAILED DESCRIPTION

Figure 1:
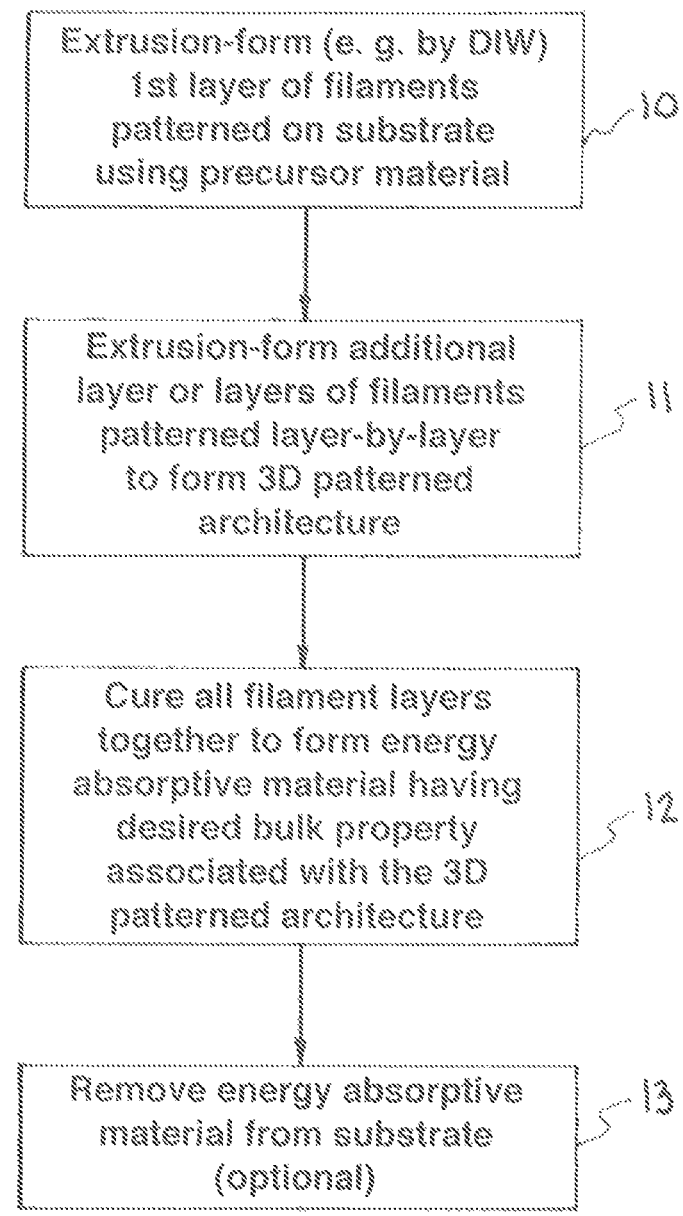
FIG. 1 is a flow diagram of an exemplary embodiment of the method of fabricating a three-dimensionally patterned energy absorptive material of the present invention.

Turning now to the drawings, FIG. 1 shows a generalized flow chart of an example method of fabricating the three-dimensionally patterned energy absorptive material of the present invention. In particular at 10, a first layer of filaments is extrusion-formed, such as by direct ink write (DIW) and patterned on a substrate using a curable precursor material. Extrusion-forming may be performed using an extrusion printer (not shown) capable of precision patterning the precursor material (e.g. siloxane resin). In particular, the printhead (or nozzle) may consist of a single- or multiple nozzle configuration. Furthermore, printing may occur on planar or nonplanar substrates, and may be done in serial (i.e. one filament at a time) or in parallel (multiple filaments at a time). Printing may also be performed in a roll-to-roll fashion.

Next at block 11, one or more additional layer or layers of filaments are extrusion-formed and patterned layer-by-layer to form a three-dimensionally (3D) patterned architecture associated with a desired bulk property of the energy absorptive material. The bulk properties for a given 3D patterned architecture may be determined, for example, by computer modeling as described in the Summary.

At block 12, the filament layers are then cured (e.g. via gelation and/or a chemical curing mechanism) to solidify the form the energy absorptive material having the desired bulk property associated with the 3D patterned architecture. It is appreciated that curing may be performed altogether at the completion of printing, or may be progressively cured in situ, depending on the type of pre-cursor or constituent material used.

At block 13, the solidified energy absorptive material is then removed from the substrate upon which it is fabricated. It is appreciated in the alternative that the energy absorptive material may be kept together with the substrate, such as for example, where the substrate functions as a backplate.

Figure 2:
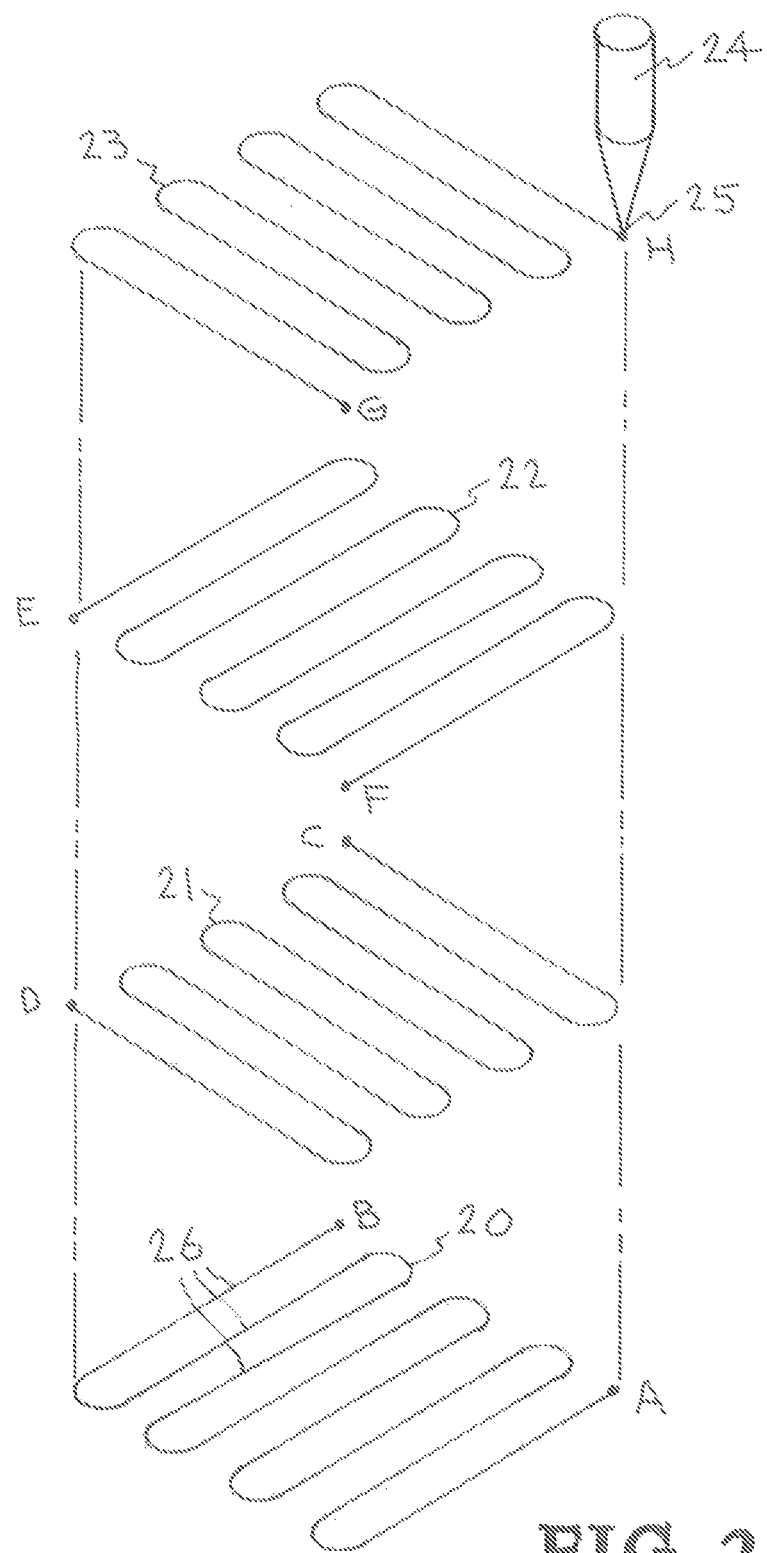
FIG. 2 is an exploded perspective view of various filament layers patterned layer-by-layer into a three-dimensionally patterned architecture of an exemplary embodiment of the energy absorptive material of the present invention.

FIG. 2 shows an exploded perspective view of various filament layers patterned layer-by-layer into a three-dimensionally patterned architecture of an exemplary embodiment of the energy absorptive material of the present invention. A first layer of patterned filaments 20 is shown as a single continuously extrusion-formed filament that switches back and forth across a substrate (not shown) in a controlled pattern to form multiple filament segments such as 26 arranged substantially parallel with each other, and with predetermined filaments features, including filament cross-sectional shape and width, spacing between filaments, and length per switchback segment. As shown, the first layer of patterned filaments begins at point A and ends at point B. It is appreciated that while the first layer is formed as a single continuously extrusion-formed filament, the filament segments may be individually formed as a discrete segment.

A second layer of patterned filaments 21 is shown formed on the first layer 20 in a similar manner as for the first layer, as a single continuously extrusion-formed filament beginning at point C and ending at point D. Furthermore, third and fourth layers of patterned filaments 22 and 23, respectively, are also shown similarly formed as single continuously extrusion-formed filaments, with the third layer 22 starting at point F and ending at point E, and the fourth layer 23 starting at point G and ending at point H. A print head 24 of a direct write ink system is shown having a nozzle 25 from which the precursor material is extruded from. While each of the filament layers may be independently formed in a layer-by-layer process separate and apart from the other layers, the three-dimensionally patterned architecture of the multiple layers may be formed in the alternative as a single continuously extrusion-formed filament by connecting points B and C between the first and second layers, connecting points D and E between the second and third layers, and connecting F and G between the third and fourth layers.

Figure 3:
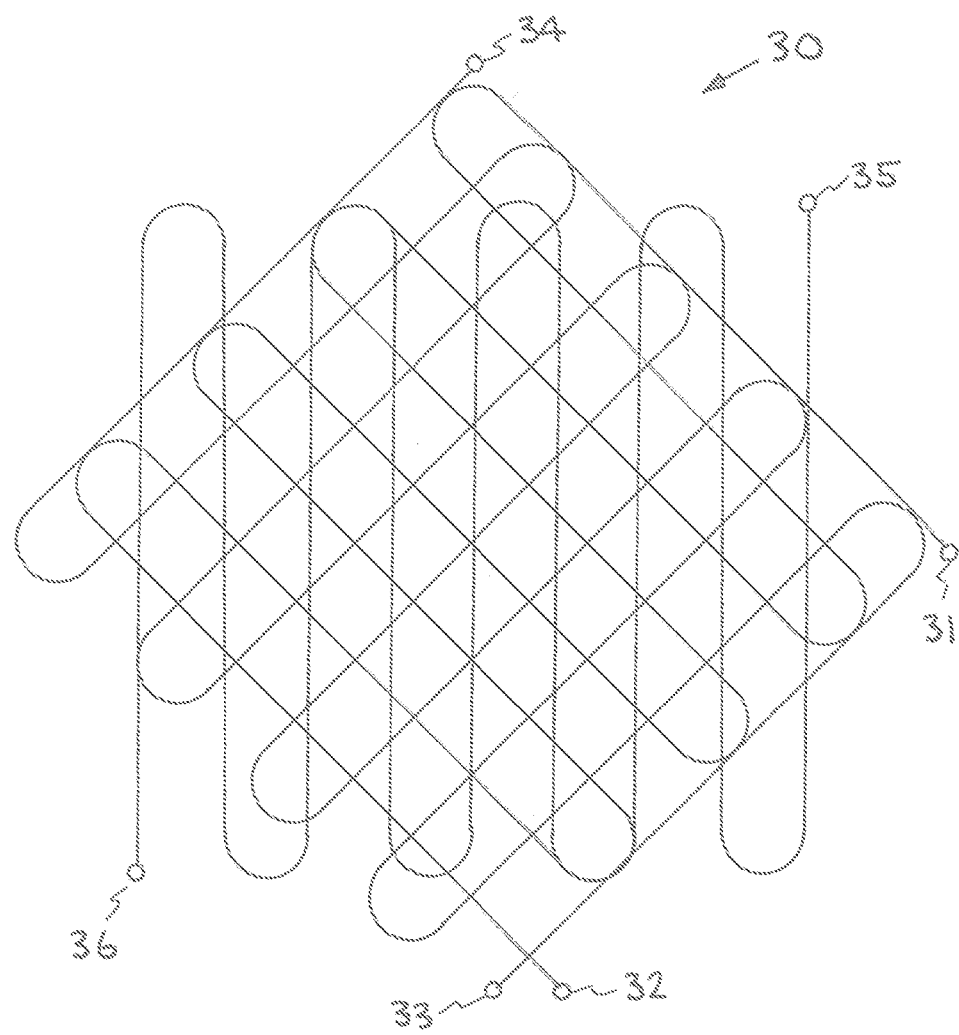
FIG. 3 is a top view of another exemplary embodiment of the energy absorptive material of the present invention.

FIG. 3 shows a top view of another exemplary embodiment of the energy absorptive material of the present invention, generally indicated at 30. Three layers are shown having filaments patterned generally transverse to each other. In particular the filament layer defined between points 31 and 32 have filament segments that are orthogonally oriented with respect to the filament segments of the filament layer defined between points 33 and 34. And a third filament layer defined between points 35 and 36 is shown transversely arranged at a substantially 45 degree angle to the two previous filament layers. The 3D patterned architecture 30 of FIG. 3 is only one illustrative arrangement of filament layers relative to each other, with other architectures having different stacked arrangements.

Figure 4:
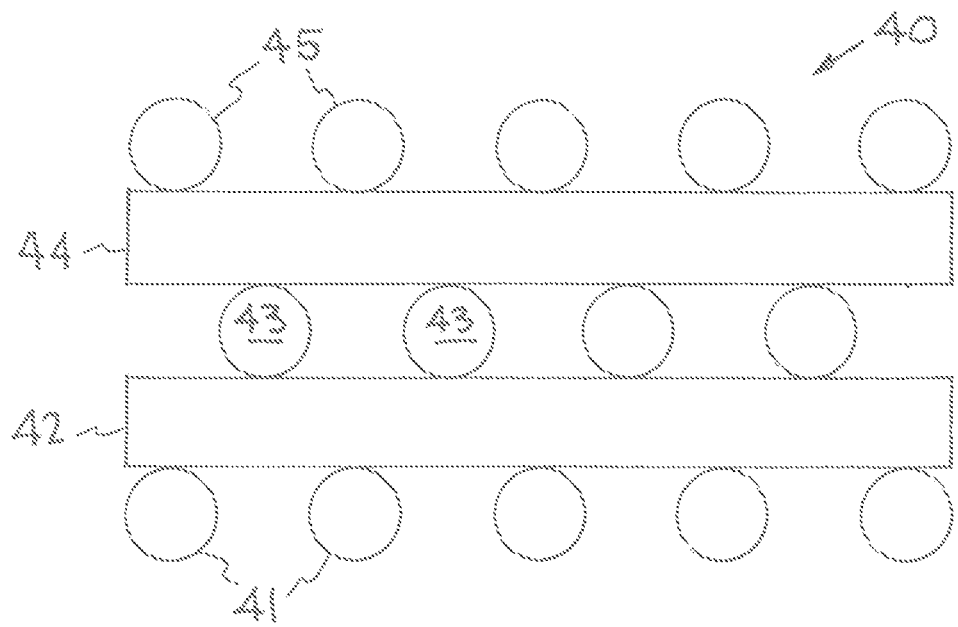
FIG. 4 is a cross-sectional view of another example embodiment of the energy absorptive material of the present invention 40, having five representative filament layers, and an offset alignment of filaments
Figure 5:
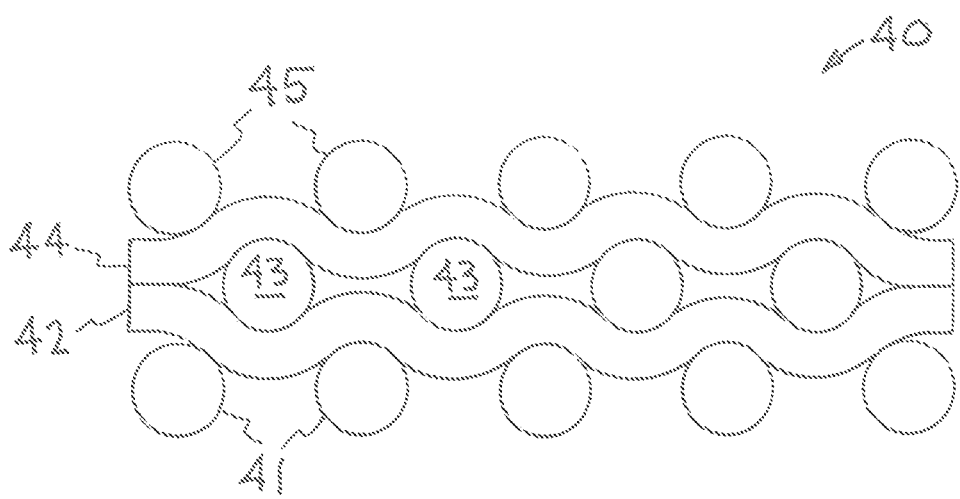
FIG. 5 is a cross-sectional view following FIG. 4 after being compressed.

FIG. 4 shows a cross-sectional view of another example embodiment of the energy absorptive material of the present invention 40, having five representative filament layers represented by filaments 41 for the first layer, filaments 42 for the second layer, filaments 43 for the third layer, filaments 44 for the fourth layer and filaments 45 for the fifth layer. As shown the filament layers having filaments arrangement substantially parallel to each other (e.g. layers represented by 41, 43 and 45) are arranged such that alternating layers have filaments that are offset from each other. As such, filaments 43 are offset from filaments 41 and 45, while filaments 41 and 45 are shown arranged in a vertically stacked arrangement. As shown in FIG. 5, this example stacking arrangement of the 3D patterned architecture of FIGS. 4, when compressed, has a certain bulk property (e.g. compression strength) that is determined by and associated with the particular 3D patterned architecture. As such, in FIG. 5, the offset arrangement of filaments 43 function to contort both adjacent filament layers (represented by filaments 42 and 43). Pores are also formed between the filaments, with pore dimensions and properties determined by spacing and other positioning of the filaments.

Figure 6:
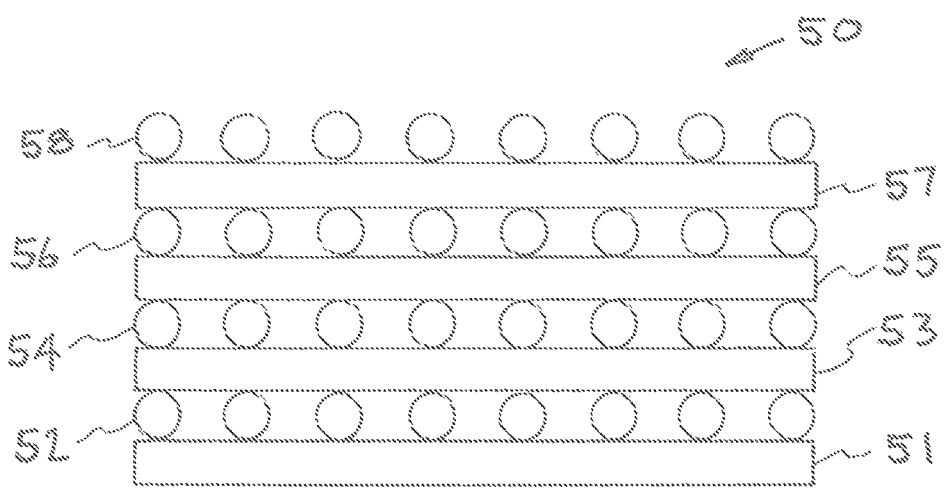
FIG. 6 is a cross-sectional view of another example embodiment of the energy absorptive material of the present invention 50 with a vertically aligned stacked arrangement of filaments.
Figure 7:
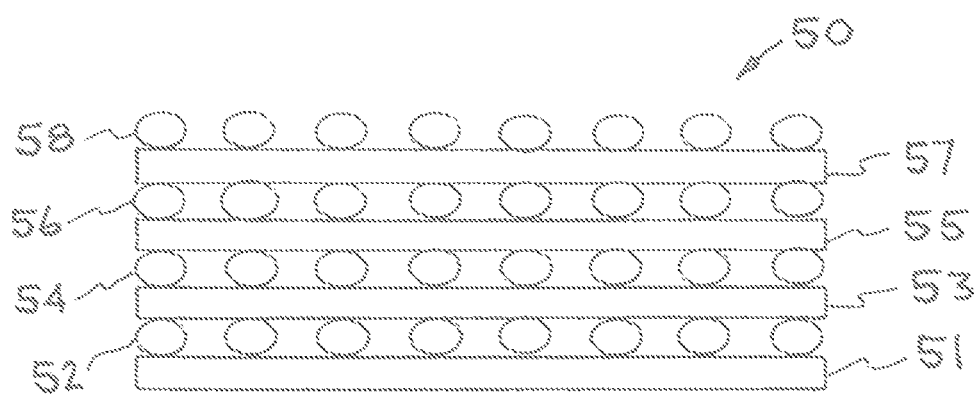
FIG. 7 is a cross-sectional view following FIG. 6 after being compressed.

In comparison to FIGS. 4 and 5, FIGS. 6 and 7 shown an alternative example embodiment of the energy absorptive material of the present invention generally indicated at 50, having a different stacked arrangement of filaments and thus a different 3D patterned architecture. As shown in FIGS. 6 and 7, eight representative filament layers 1-8 are shown, represented by filaments 51 to 58, respectively. In this architecture, the filaments of alternating layers (e.g. 52, 54, 56 and 58) are vertically aligned such that compression strength is increased due to the vertical support provided by the stacked filaments. In this regard, it is appreciated that filament properties and spacing may be engineered to tailor the filament density, to produce a 3D patterned architecture having a bulk property that is associated with and attributable to its architecture. The filaments may also be arranged (e.g. spaced) so that the desired property is uniform throughout said material. in the alternative, the filaments may be arranged so that the desired property is different for different regions of said material. As such, in the material and fabrication method of the present invention structure and properties may be uniform or graded. For example, a part may have uniform or graded compressive strength over a given distance. If uniform, then the energy can be dissipated isotropically. And if graded, then the energy can be dissipated directionally. it is also appreciated that the 3D patterned architecture may be formed with at least one of open cells, closed cells, or some open and some closed cells, which may be determined again by the particular spacing and arrangement of the filaments.

Figure 8:
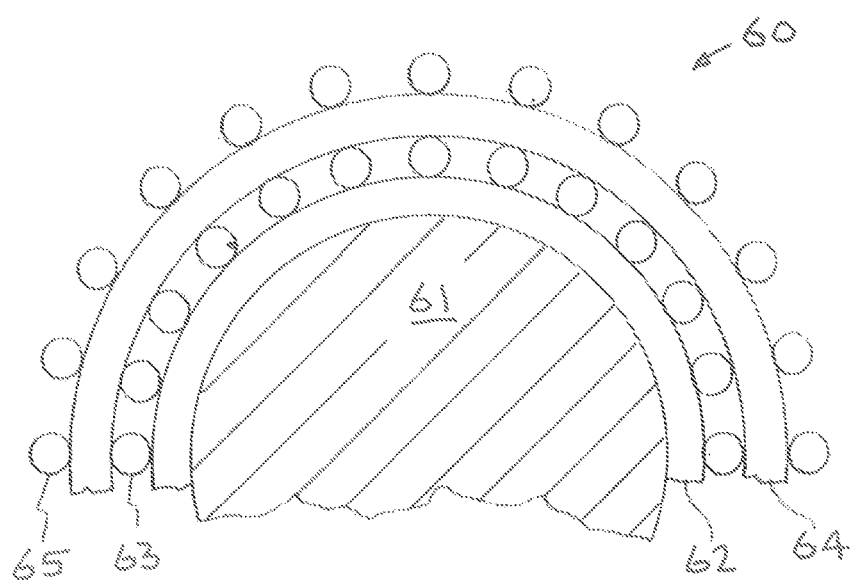
FIG. 8 is a cross-sectional view of another exemplary embodiment of the present invention fabricated on a non-planar substrate.

And FIG. 8 shows another example embodiment of the present invention 60 where the multiple layers of filaments, represented by filaments 62-65, are extrusion-formed on a non-planar substrate 61 so that the energy absorptive material formed on the substrate is also shaped with a non-planar surface contour. In particular, the non-planar substrate may be used to outline a three-dimensional object against which the fabricated material is intended to absorb/dissipate energy from, so that the material may substantially conform to the 3D object. And after fabrication, the material 60 may be removed from the substrate, or kept on the substrate for use with the substrate, such as for example, as a backplate.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

We claim:

1. A three-dimensionally patterned mechanical energy absorptive material comprising:
   a stack of directly bonded elastomeric filament layers wherein elastomeric filaments of said elastomeric filament layers are extrusion-formed from a pre-cursor material and simultaneously cured so that the elastomeric filaments of a first elastomeric filament layer are directly bonded to the elastomeric filaments of an adjacent elastomeric filament layer and the mechanical energy absorptive material has a pre-determined bulk property profile that absorbs mechanical energy with a pre-determined mechanical response.

2. The three-dimensionally patterned mechanical energy absorptive material of claim 1,
   wherein the filaments are patterned so that the three-dimensionally patterned architecture comprises at least one of open-cells and closed cells between filaments.

3. The three-dimensionally patterned mechanical energy absorptive material of claim 1,
   wherein the filaments are patterned so that the pre-determined bulk property profile of the mechanical energy absorptive material is uniform in at least one direction across different regions of the mechanical energy absorptive material.

4. The three-dimensionally patterned mechanical energy absorptive material of claim 1,
   wherein the filaments are patterned so that the pre-determined bulk property profile of the mechanical energy absorptive material is different for different regions of the mechanical energy absorptive material.

5. The three-dimensionally patterned mechanical energy absorptive material of claim 4,
   wherein the filaments are patterned so that the pre-determined bulk property profile of the mechanical energy absorptive material is graded across the different regions of the mechanical energy absorptive material along at least one direction.

6. The three-dimensionally patterned mechanical energy absorptive material of claim 1,
   wherein the filaments of a layer are transversely patterned relative to filaments of an adjacent layer.

7. The three-dimensionally patterned mechanical energy absorptive material of claim 1,
   wherein the mechanical energy absorptive material has a non-planar surface contour.

8. The three-dimensionally patterned mechanical energy absorptive material of claim 7,
   wherein the non-planar surface contour of the energy absorptive material substantially conforms to a 3D object against which mechanical energy is to be absorbed.

* * * * *